United States Patent [19]

Nash et al.

[11] Patent Number: 5,467,231

[45] Date of Patent: Nov. 14, 1995

[54] USING RECORDED DATA FOR AUTO CALIBRATION OF FIXED GAIN OF A READ AMPLIFIER IN A DATA STORAGE DEVICE

[75] Inventors: Mark E. Nash, Lyons; Ronald R. Kennedy, Fort Collins, both of Colo.

[73] Assignee: Hewlett-Packard Company, Palo Alto, Calif.

[21] Appl. No.: 322,964

[22] Filed: Oct. 13, 1994

Related U.S. Application Data

[63] Continuation of Ser. No. 23,532, Feb. 26, 1993, abandoned.

[51] Int. Cl.$^6$ .................................. G11B 5/09; G11B 5/02
[52] U.S. Cl. .................................. 360/46; 360/41
[58] Field of Search .................. 360/46, 51, 55, 360/61, 65, 39, 67, 45, 50, 40, 41

[56] References Cited

U.S. PATENT DOCUMENTS

| | | | |
|---|---|---|---|
| 3,402,402 | 9/1968 | Dorrell et al. | 360/67 |
| 3,593,334 | 7/1971 | Bicket | 360/67 X |
| 3,691,543 | 9/1972 | Mueller | 340/474.1 B |
| 3,801,830 | 4/1974 | Bajer | 307/235 R |
| 4,169,232 | 9/1979 | Henrich | 307/354 |
| 4,564,370 | 1/1986 | Kitamura | 360/51 X |
| 4,634,896 | 1/1987 | Shrinkle | 307/351 |
| 4,635,142 | 1/1987 | Haughland | 360/46 |
| 4,771,188 | 9/1988 | Cheng et al. | 307/351 |
| 4,789,838 | 12/1988 | Cheng | 307/350 |
| 4,794,469 | 12/1988 | Kaido et al. | 360/46 |
| 5,220,466 | 6/1993 | Coker et al. | 360/39 X |
| 5,255,129 | 10/1993 | Jones | 360/40 |
| 5,255,130 | 10/1993 | Buchan et al. | 360/41 |
| 5,361,175 | 11/1994 | Richardson et al. | 360/46 |
| 5,361,176 | 11/1994 | Schwartz et al. | 360/46 |

*Primary Examiner*—Donald T. Hajec
*Assistant Examiner*—Thien Minh Le
*Attorney, Agent, or Firm*—Augustus W. Winfield

[57] ABSTRACT

A method and apparatus for using a varying amplitude data signal from a data storage medium such as a magnetic disk or magnetic tape to calibrate the gain of the data signal amplifier to an optimal fixed gain. At initialization, amplified data signal peaks are detected over a data region of the data storage medium. The amplified signal peaks are compared to a predetermined reference. The signal amplifier gain is adjusted until only a few amplified signal peaks exceed the reference. The amplifier gain is then fixed at the final adjusted value.

7 Claims, 2 Drawing Sheets

USING RECORDED DATA FOR AUTO CALIBRATION OF FIXED GAIN OF A READ AMPLIFIER IN A DATA STORAGE DEVICE

CROSS REFERENCE TO RELATED APPLICATION

This is a continuation of application Ser. No. 08/023,532, filed on Feb. 26, 1993, now abandoned.

FIELD OF INVENTION

This invention relates generally to data storage devices such as disk drives and tape drives and more particularly to auto-calibration of read amplifier gain.

BACKGROUND OF THE INVENTION

In magnetic data storage devices such as disk drives and tape drives, analog signals being read from a magnetic medium (disk or tape) are typically amplified, differentiated and then passed through a zero crossing detector for conversion back into a binary signal. The peaks of the raw signal before amplification become zero crossings after differentiation. The digital information is contained in the zero crossing timing. Therefore, the digital information is contained in the timing of the unamplified peaks and not in the amplitude of the peaks. If the gain of the amplifier is too high, the peaks may become distorted or clipped so that critical timing information is lost. If the gain is too low, some peaks may not be detected so that data is missed.

It is common for some drives to record an initialization area on the magnetic medium for head alignment adjustment and for calibration of the gain of the analog amplifiers. Gain calibration is typically done once when the power is turned on or when a new medium is inserted. For example, for tape drives, the initialization signal is typically a single frequency burst recorded close to the beginning of tape and before the data area of the tape. This initialization area is typically recorded once when the medium is formatted and is not rewritten unless the medium is reformatted.

When a magnetic medium having magnetized areas passes over a magnetic head, the magnetized areas of the medium are partially erased. In addition, even with no usage, some self erasure may occur over time. Over time, with repeated passes, the amplitude of a raw signal from the magnetized areas may eventually degrade by as much as 25%. With a properly adjusted analog read circuitry gain, a 25% degradation in analog signal amplitude will not result in a corresponding degradation of digital data. However, if the analog read circuitry gain is calibrated from a calibration signal amplitude which has degraded such that it is 25% lower than the signal amplitude of more recently written data areas, the analog gain may be set too high. This may distort the data signals sufficiently to degrade digital data integrity.

There is a need for analog gain calibration using actual data signals. This has three potential advantages. First, data fields are less subject to degradation because individual data fields on average do not see as many passes of the head as the area which is used for initial alignment. Second, data fields are less subject to degradation because they are typically rewritten frequently. Finally, regardless of amplitude, the data fields contain the actual information which needs to be extracted.

Use of actual random data signals for amplitude calibration has a problem which must be overcome. The analog signal amplitude varies with frequency. A calibration reference burst is typically a single frequency resulting in a single amplitude. Actual random data fields have varying frequency depending on the digital data pattern. Therefore, when using actual random data, there must be a way to calibrate gain using a varying amplitude calibration signal. Continuous automatic-gain-control (AGC) circuits may be used. However, in digital recording, AGC must typically be disabled for initial head alignment and media verification. In addition, some sort of gain hold must be provided when the head passes over non-data or erased areas of the medium. Providing circuitry for setting gain with AGC disabled and circuitry for holding gain may add complexity. The present invention provides an alternative method which provides an optimized fixed gain.

SUMMARY OF THE INVENTION

The present invention uses random data in actual data fields to calibrate analog gain in a magnetic data recording device. Each time the drive is powered on and each time a magnetic medium is inserted the drive executes an initialization process. During initialization, the data area of the medium is read, not for the data content but to characterize signal levels. The amplitude of the data signal varies but only the highest peaks are of interest. Sufficient data is read to ensure that the gain is set such that only a few of the highest amplitude signal peaks exceed a predetermined fixed voltage threshold.

DETAILED DESCRIPTION OF THE PREFERRED EMBODIMENT OF THE INVENTION

Figure 1:
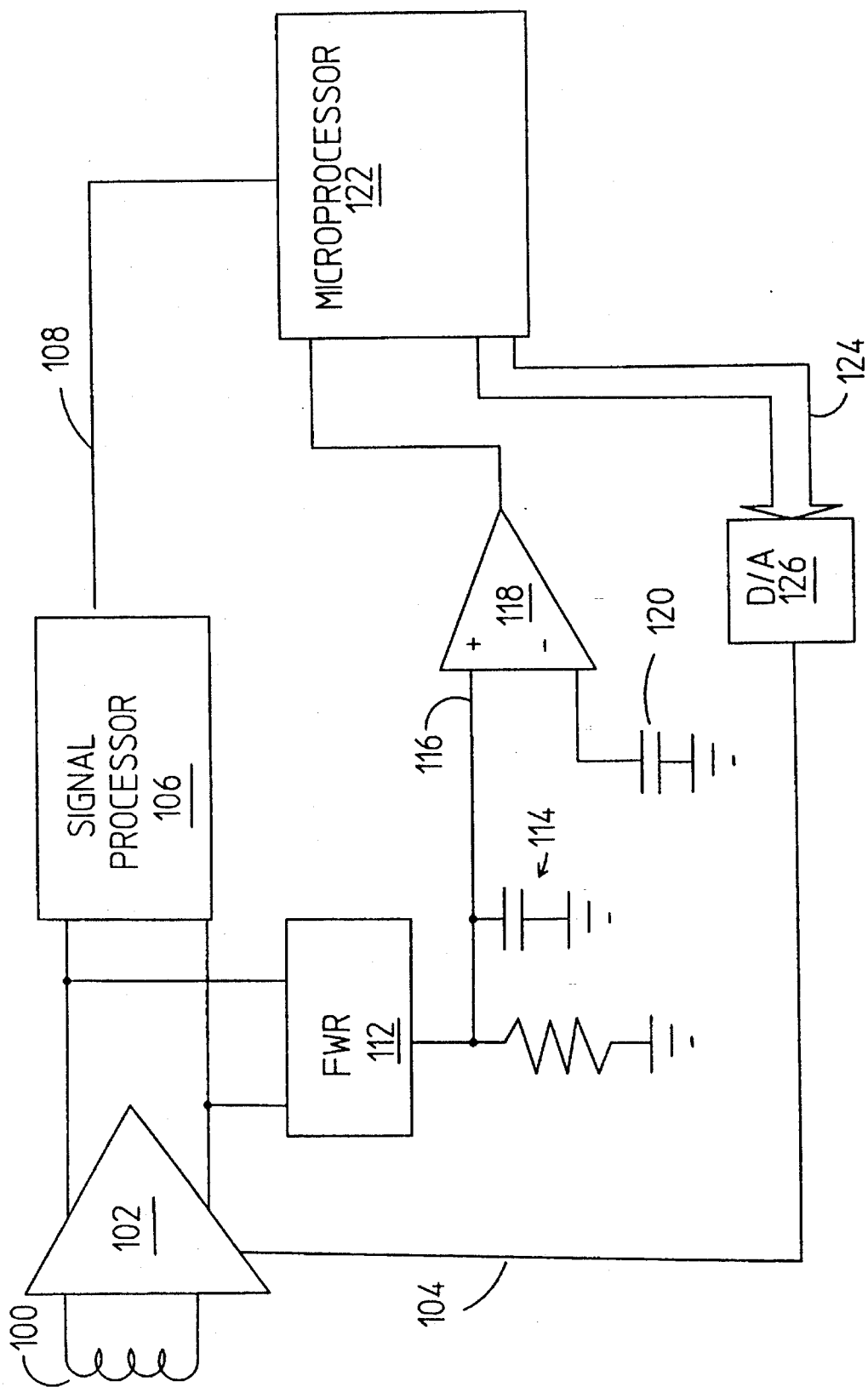
FIG. 1 is a block diagram schematic of part of the read channel for a data storage device with a microprocessor adjustable gain for an analog amplifier.

FIG. 1 illustrates a simplified block diagram schematic of the read channel for the magnetic data storage drive such as a disk drive or tape drive. Coil 100 is a sensor for magnetic fields from data recorded on a magnetic medium. The sensor may be a conventional coil as illustrated or some other magnetic field sensing technology such as a magnetoresistive element in a thin film head. The raw signal is first amplified by an amplifier 102 which has an externally adjustable gain input 104. The amplified signal goes on to additional signal processing circuitry 106 for differentiation and conversion into binary data 108. The signal processing circuitry 106 needs the gain of amplifier 102 to be high to maximize signal to noise but not so high that signal peaks (which are the critical zero crossings after differentiation) are distorted. The non-differentiated signal also goes through a gain calibration path as illustrated in FIG. 1. This calibration path is used only during initialization after power-on or after a data storage medium (for example, tape or disk) is inserted. After initialization, the gain of amplifier 102 is fixed.

In the calibration path, a full wave rectifier (FWR) circuit 112 and additional low pass filming 114 generate a DC input 116 for an analog comparator 118. The rectifier 112 and filter 114 function as a peak detector. The other input to the analog comparator 118 is a predetermined fixed reference voltage 120. The reference voltage 120 may be implemented for example as a simple resistor divider from the power supply. The binary output of the comparator 118 is sensed by a microprocessor 122. Microprocessor 122 also has a digital output 124 to a digital to analog converter (D/A) 126 which has an analog output which controls the gain of amplifier 102. The microprocessor digital output 118 and digital-to-analog converter 126 may be implemented for example by resistor ladder techniques or by a pulse width modulated digital signal and simple low pass filtering.

The signal processing circuitry 106 is designed for a particular peak-to-peak amplitude which may vary among drive types. The comparator threshold voltage 120 is set to half of the particular peak-to-peak amplitude for the particular drive type. That is, the reference voltage 120 is set to the desired level of the maximum peaks of the amplified non-differentiated signal. If the gain of amplifier 102 is too high, the peak detector signal 116 at comparator 118 will be higher than the reference voltage 120 for most of the time. If the gain of amplifier 102 is too low, the peak detector signal 116 at comparator 118 will never exceed the threshold voltage 120. In the preferred embodiment of the present invention, the gain is adjusted so that the peak detector signal 116 at comparator 118 will exceed the reference voltage 120 for 5% of the time.

Figure 2:
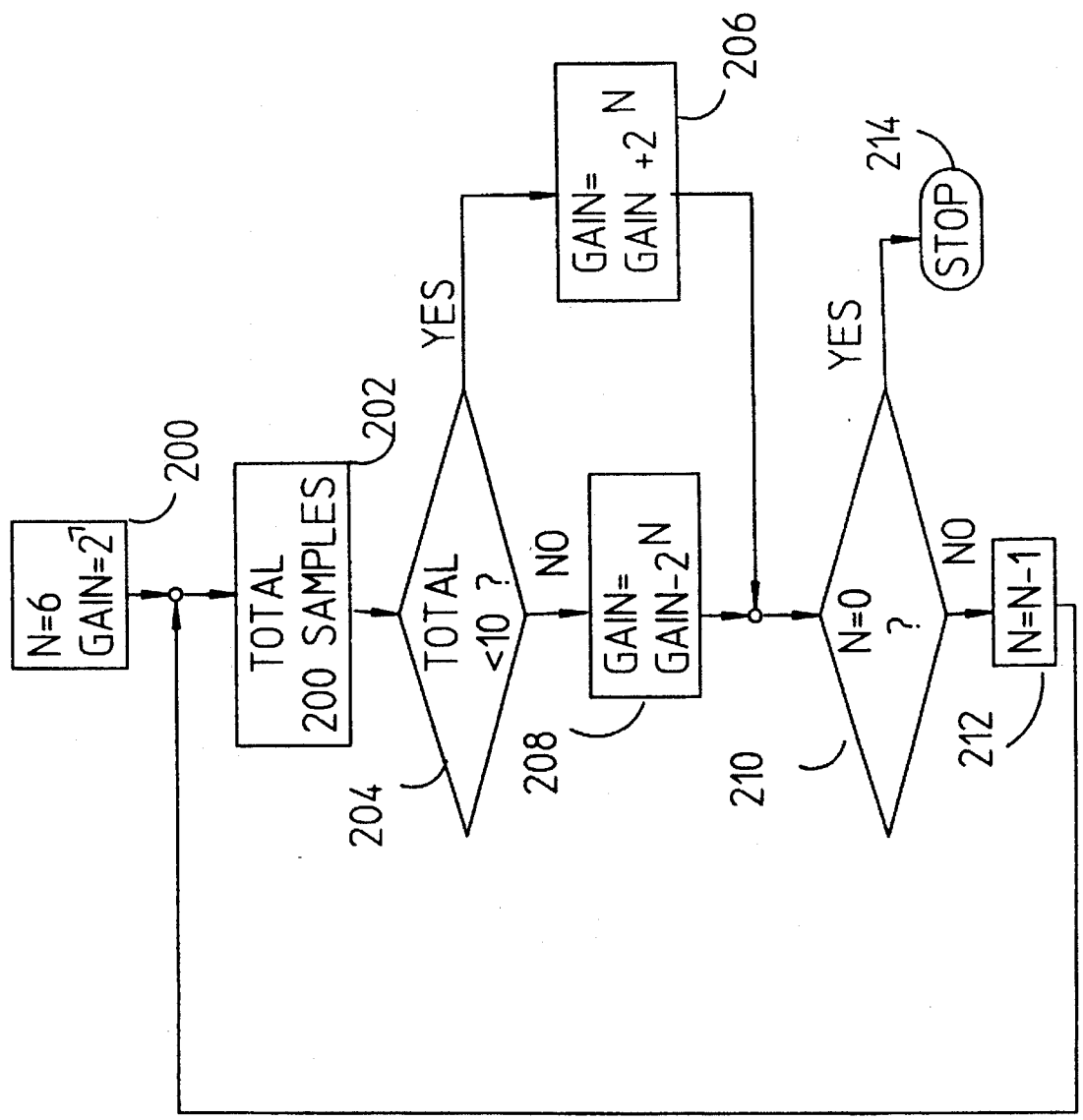
FIG. 2 is a flow chart for a method of calibrating gain using varying amplitude data.

The microprocessor 122 uses a binary convergence method to find the proper gain in a minimal number of iterations. This method is illustrated in FIG. 2. FIG. 2 illustrates a specific embodiment in which the digital gain number 124 (FIG. 1) is an 8 bit number. The word "gain" in the flow chart of FIG. 2 refers to that binary number. The actual analog gain of amplifier 102 is then appropriately scaled from the binary number 124 by analog circuitry.

In FIG. 2, the digital input (126) to D/A 126 is first set to the mid-point (step 200). For an 8-bit number this is decimal 128 ($2^7$). Processor 122 then moves the medium a fixed distance while sampling the output of comparator 118. The processor takes 200 samples and computes the total number of times the output of comparator 118 was a binary "ONE" during a sample (step 202). If less than 5% of the 200 comparator samples are binary ONE (decision 204) then the gain is too low. The gain is then increased by $2^N$ (step 206). For example, for the first pass, N is 6 so gain is increased from 128 to 128+64. If more than 5% of the comparator samples are binary ONE (decision 204) then the gain is too high. The gain is then decreased by $2^N$ (step 208). Subsequent adjustments of gain, if necessary, are in steps of 32, 16, 8 . . . 1 (steps 210, 212). When 5% of the 200 sample binary outputs of comparator 118 are binary ONE then the gain of amplifier 102 is at the proper level and no further adjustment is necessary (step 214).

From the above, it can be seen that the present invention provides a method for a one-time calibration of analog amplifier gain using varying amplitude actual random data as the calibration source. The method adjusts the gain so that only a few peaks exceed a predetermined threshold voltage.

The foregoing description of the present invention has been presented for purposes of illustration and description. It is not intended to be exhaustive or to limit the invention to the precise form disclosed, and other modifications and variations may be possible in light of the above teachings.

The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A calibration system in a data storage system, having an analog data signal amplified by an amplifier, the amplifier having a gain that is variable, the calibration system adjusting the gain to a fixed calibrated gain before extracting data from the analog data signal using the fixed calibrated gain, the calibration system comprising:

the analog data signal having a data pattern that is unknown;

a threshold that is predetermined;

a reference fraction that is predetermined;

the amplifier having a gain control input;

the amplifier receiving the analog data signal and generating an amplified signal, the amplified signal having peak amplitudes; and means for adjusting the gain, the means for adjusting receiving the amplified signal and the threshold and having a gain control output controlling the amplifier gain control input, the means for adjusting changing the gain until a fraction of the peak amplitudes exceeding the threshold exceeds the reference fraction.

2. The calibration system of claim 1, the means for adjusting further comprising:

a peak detector, receiving the amplified signal and having a peak detector output;

a comparator, receiving the peak detector output and the threshold and having a comparator output, the comparator output indicating whether the peak detector output is greater than the threshold;

a microprocessor, receiving the comparator output and having the gain control output, the microprocessor controlling the gain to decrease if the fraction of the peak amplitudes exceeding the threshold exceed the reference fraction; and the microprocessor controlling the gain to increase if the fraction of the peak amplitudes exceeding the threshold is less than the reference fraction.

3. The calibration system of claim 2 wherein the data storage system is a magnetic disk drive.

4. The calibration system of claim 2 wherein the data storage system is a magnetic tape drive.

5. A calibration method in a data storage system having an analog data signal amplified by an amplifier, the amplifier having a gain that is variable, the calibration method adjusting the gain to a fixed calibrated value before extracting data from the analog data signal using the fixed calibrated gain, the calibration method comprising the following steps:

(a) detecting a peak in the analog data signal, the analog data signal having a data pattern that is unknown;

(b) comparing the peak of step (a) to a threshold that is predetermined;

(c) saving the result of step (b) as a sample;

(d) repeating steps (a)–(c) to obtain multiple samples;

(e) computing the fraction of the samples from step (d)

that exceed the threshold;

(f) decreasing the gain if the fraction from step (e) exceeds a reference fraction that is predetermined;

(g) increasing the gain if the fraction from step (e) is less than the reference fraction; and (h) repeating steps (a) through (g) until the fraction from step (e) is equal to the reference fraction.

6. The calibration method of claim 5 wherein the data storage system is a magnetic disk drive.

7. The calibration method of claim 5 wherein the data storage system is a magnetic tape drive.

* * * * *